UNITED STATES PATENT OFFICE.

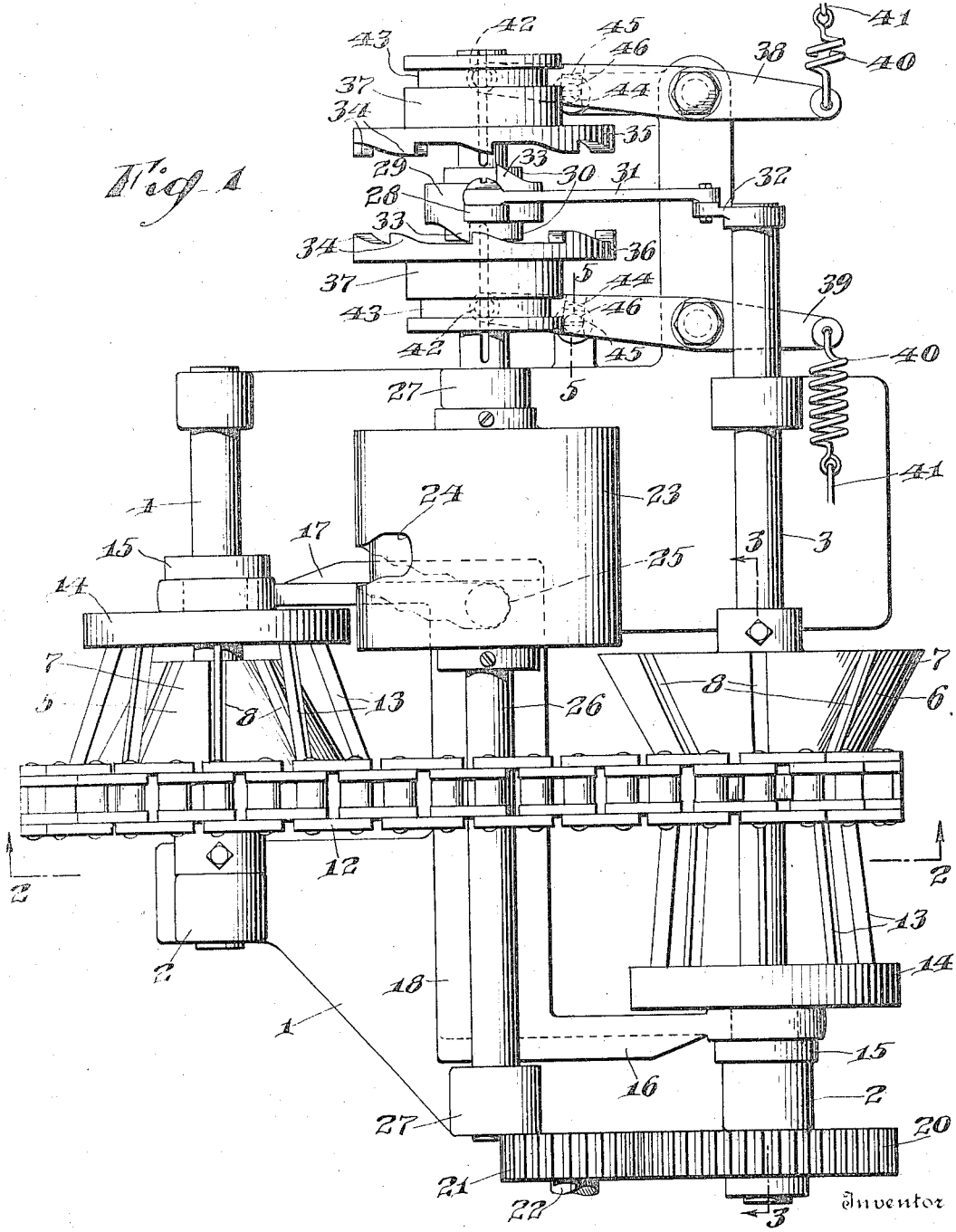

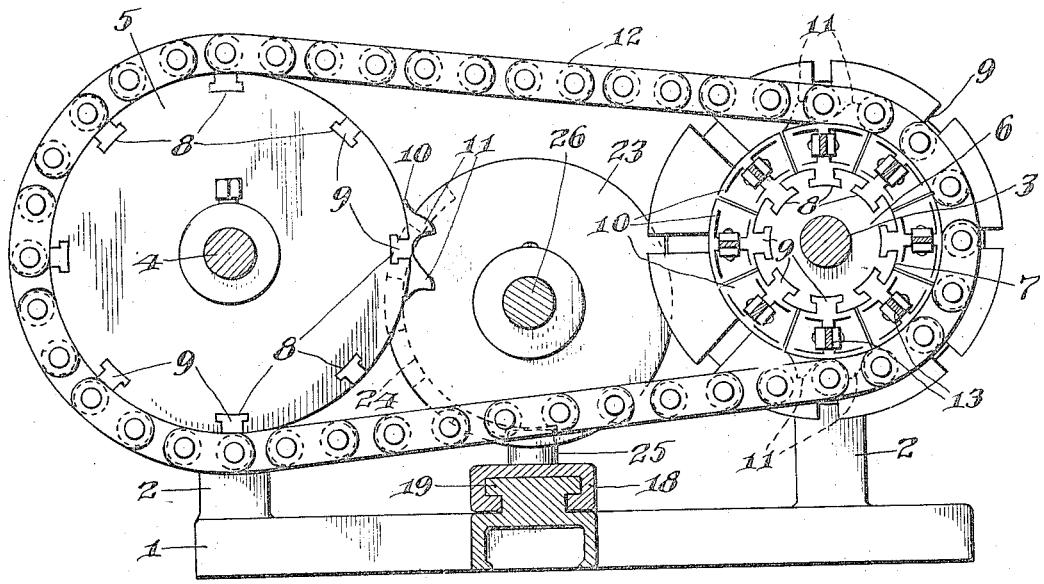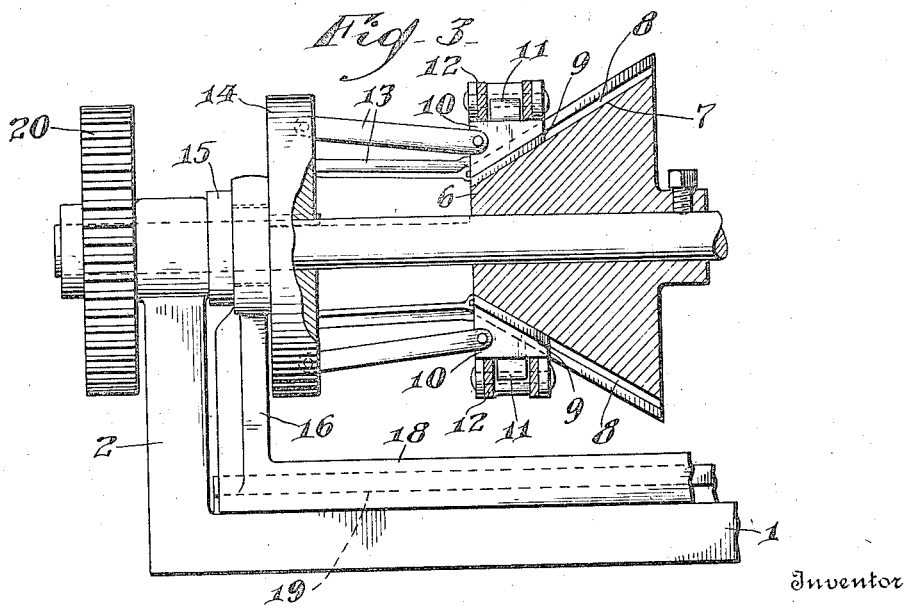

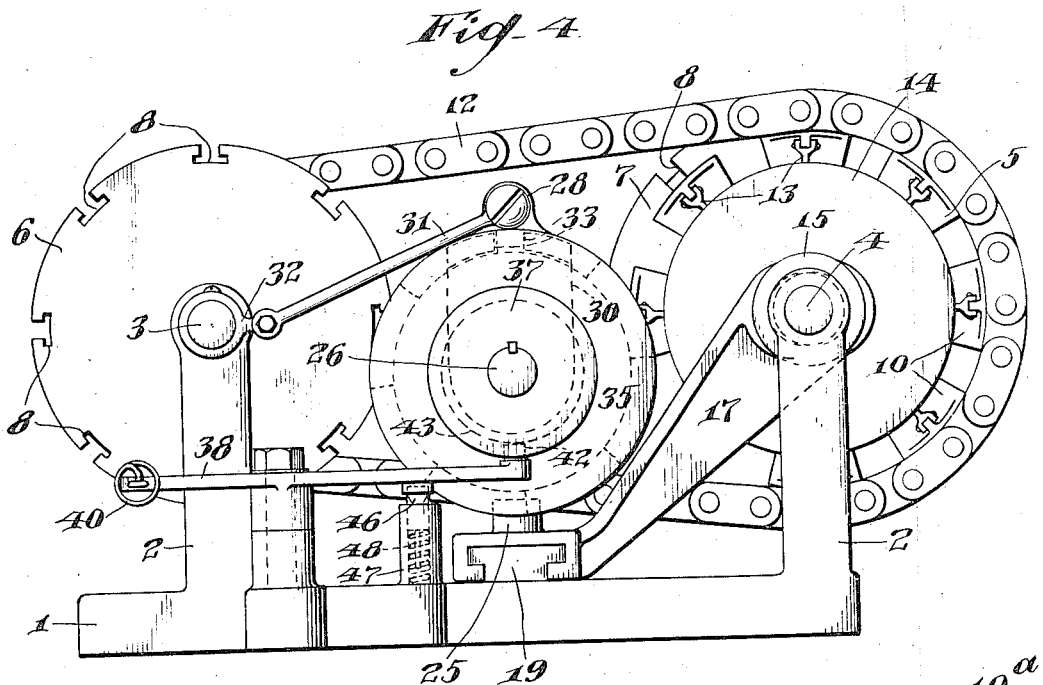

WILLIAM B. KELSEY, OF DELANCO, NEW JERSEY.

VARIABLE-SPEED MECHANISM.

1,160,414. Specification of Letters Patent. Patented Nov. 16, 1915.

Application filed April 5, 1915. Serial No. 19,322.

*To all whom it may concern:*

Be it known that I, WILLIAM B. KELSEY, a citizen of the United States, residing at Delanco, in the county of Burlington and State of New Jersey, have invented certain new and useful Improvements in Variable-Speed Mechanism, of which the following is a specification.

My invention relates to improvements in variable speed mechanism, the object of the invention being to provide a pair of expansible sprocket wheels connected by a chain, and having improved means for simultaneously varying the diameters of the respective sprocket wheels so as to vary the speed of transmission.

A further object is to provide a mechanism of the character stated in which a continually oscillating member is utilized to impart the necessary movement to adjust the sprocket wheels step by step.

With these and other objects in view, the invention consists in certain novel features of construction and combinations and arrangements of parts as will be more fully hereinafter described and pointed out in the claims.

In the accompanying drawings: Figure 1 is a plan view illustrating my improvements. Fig. 2 is a view in transverse section on the line 2—2 of Fig. 1. Fig 3 is a view in longitudinal section partly in elevation, the section being taken on the line 3—3 of Fig. 1. Fig. 4 is an end view of Fig. 1. Fig. 5 is a fragmentary view in section on the line 5—5 of Fig. 1, and Fig. 6 is a perspective view of one of the adjustable blocks 10. Fig. 7 is a view illustrating a modified form of sprocket chain supporting idler.

1 represents a bed plate having bearings 2 thereon for parallel shafts 3 and 4 respectively. On the shafts 3 and 4, expansible sprocket wheels 5 and 6 respectively are located, and as both of these sprocket wheels are alike except that they are oppositely depressed, the description hereinafter of one will apply alike to both.

Each sprocket wheel has a conical body portion 7 with dove-tailed grooves 8 in the periphery thereof, and in the dove-tailed grooves 8 the tenons 9 of blocks 10 are adapted to move. Certain of the blocks 10 have teeth 11 thereon to engage the sprocket chain. Others of the blocks 10 constitute idlers, and hold the chain in proper curved formation, but do not positively engage the same. These idler blocks 10 may take various forms, as for example, in the preferred form I have shown them with smooth outer surfaces and in the modification, Fig. 7, I have illustrated an idler block with a groove 10$^a$ in which the chain is guided, but it is to be understood that the invention is not limited to any particular shape of idler block, nor is the invention limited to any form of sprocket teeth or sprocket chain, and I would also have it understood that there is sufficient space in the links of the chain for the movement of the sprocket teeth to compensate for various adjustments.

The blocks 10 are connected by links 13 with disks 14 having grooved collars 15 mounted to slide on the shafts 3 and 4 respectively, and these grooved collars 15 are connected by forked arms 16 and 17 respectively with an adjusting slide 18. The slide 18 is guided in its longitudinal movement by a web 19 on bed plate 1, and the slide and web having a dove-tailed juncture as shown clearly in Figs. 2 and 4.

On shaft 3, I have illustrated a gear wheel 20 which is driven by a pinion 21 on a drive shaft 22 connected to any suitable source of power, so that the transmission is from sprocket wheel 6 to sprocket wheel 5, and the speed of transmission is varied by the positions of the blocks 10 on the conical body portions 7. This adjustment of the blocks is controlled and performed by a cam 23 which has a cam groove 24, receiving a pin 25 on the slide 18, and it will be noted that this groove 24 is in stepped formation and not a continuous smooth groove as it is necessary to move the pin a given distance at each adjustment in order to properly position the sprocket teeth in the links of the chain.

The cam 23 is secured upon a shaft 26, and the latter is mounted in bearings 27 on bed plate 1, and extends beyond the bed plate as clearly shown in Fig. 1. A lever 28 is secured to a sleeve 29, having rotary mounting on the shaft 26 between fixed collars 30, and the lever 28 is connected by a link 31 with a relatively short crank arm 32 on shaft 3.

As the lever 28 is appreciably longer than the crank arm 32, the rotary movement of shaft 3 imparts an oscillating movement to the lever 28, and sleeves 29. Said sleeve 29 which constitutes a part of the lever 28, is provided at opposite sides with beveled teeth 33 which are adapted to engage teeth 34 on opposed ratchet wheels 35 and 36 respectively.

The elongated hubs 37 of the ratchet wheels 35 and 36 are keyed to slide on the shaft 26, but are secured to turn with the shaft while the lever 28 is held against longitudinal movement on the shaft, but is free to oscillate.

It will be noted that the teeth 34 of the ratchet wheels 35 and 36 are oppositely positioned, and these ratchet wheels are normally spaced from the teeth 30, so that the oscillation of the lever has no effect upon the shaft 26 except when one of the ratchet wheels is moved so as to position the teeth 34 for engagement with one of the teeth 33 as indicated in Fig. 1.

To shift the ratchet wheels 35 and 36, I have provided two levers 38 and 39 respectively. These levers are connected by coiled springs 40 with flexible devices 41, and the flexible devices 41 are connected to any suitable means for operating them (not shown).

Where my improvements are for use on automobiles, I preferably provide foot pedals or hand levers to control the operation, but as this forms no part of the present invention, it is not illustrated.

The levers 38 and 39 have pins 42 which project into grooves 43 in the hubs 37 of the ratchet wheels 35 and 36 respectively, so that the movements of the levers 38 and 39 cause the ratchet wheels 35 and 36 to move longitudinally on shaft 26. To hold the levers 38 and 39 in their positions of adjustment, I provide beveled notches 44 and 45 in the lower face of each lever, and locate plungers 46 below the levers, said plungers having beveled ends to engage in the notches.

Each plunger is supported in a hollow post 47, and is pressed upwardly by a spring 48 and is adapted not only to hold the levers in a position of adjustment, but also to further the adjustment by reason of the inclination of the walls of the notches and the plunger. In other words, if the lever moves only part of its normal distance, the beveled contacting surfaces of the notches and the plungers will complete the movement so as to insure a proper adjustment.

The springs 40 constituting a part of the flexible connection between the levers 38 and 39 and their operating means permits the ratchet wheels 35 and 36 to move a certain distance, and allow the teeth 33 to ride over the teeth 34 during the movement of the lever 28 in one direction. This ratcheting of the teeth is permitted by reason of the beveled formation of the teeth as indicated clearly in the drawing, as it is the purpose of the construction to permit the movement of the ratchet wheels in one direction only while the opposite movement of the lever 28 can only operate as a ratchet device to ride over the teeth in the event one of the ratchet wheels is held in position for such contact.

It is of course to be understood that the lever 28 has an oscillation sufficient to turn one of the ratchet wheels and the shaft 26 the proper distance to position the pin 25 in one of the steps of the groove 24 in cam 23, and there are as many adjustments as there are steps in the groove, and the operator can move the parts to any adjustment desired.

In Fig. 1, the sprocket wheel 6 which constitutes the driver is small, and sprocket wheel 5 is large, but these proportions may be varied by the turning movement of the cam as above explained, as this movement of the cam moves the slide 18 and causes the disks 14 to move governing the positions of the blocks 10 on the conical body 7, and varying the diameter of the sprocket wheels. The movement of the cam is controlled by the oscillating lever 28 as above explained, and the operator can be located at any distance and control the speed of transmission.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A mechanism of the character stated, comprising two expansible sprocket wheels, a sprocket chain connecting the sprocket wheels, a movable device connected to and constructed to compel the simultaneous adjustment of the sprocket wheels, and a stepped cam controlling the movement of said device, substantially as described.

2. A mechanism of the character stated, comprising two expansible sprocket wheels, a sprocket chain connecting the sprocket wheels, a movable device connected to and constructed to compel the simultaneous adjustment of the sprocket wheels, a cam controlling the movement of said device, an oscillating member, and ratchet members normally spaced from the oscillating member and adapted to be moved thereby to turn the cam, substantially as described.

3. A mechanism of the character stated, comprising two expansible sprocket wheels, a sprocket chain connecting the sprocket wheels, a movable device connected to and constructed to compel the simultaneous adjustment of the sprocket wheels, a cam having a stepped formation controlling the movement of the device, an oscillating member, and ratchet members normally spaced from the oscillating member and adapted to be moved thereby to turn the cam, substantially as described.

4. A mechanism of the character described, comprising two oppositely positioned expansible sprocket wheels, a chain connecting the sprocket wheels, a cam constructed to simultaneously adjust both sprocket wheels, a shaft secured to turn with the cam and having two facing ratchet wheels spaced apart and keyed to the shaft, an oscillating lever on the shaft between the ratchet wheels, said oscillating lever having teeth on its opposite faces, and means for moving either of said ratchet wheels into engagement with the oscillating lever, substantially as described.

5. A mechanism of the character described, comprising two oppositely positioned expansible sprocket wheels, a chain connecting the sprocket wheels, a cam constructed to simultaneously adjust both sprocket wheels, a shaft secured to turn with the cam and having two facing ratchet wheels spaced apart and keyed to the shaft, an oscillating lever on the shaft between the ratchet wheels, said oscillating lever having teeth on its opposite faces, means for continuously oscillating the lever, and means for moving either of the ratchet wheels into engagement with the lever, substantially as described.

6. A mechanism of the character described, comprising two oppositely positioned expansible sprocket wheels, a chain connecting the sprocket wheels, a cam constructed to simultaneously adjust both sprocket wheels, a shaft secured to turn with the cam and having two facing ratchet wheels spaced apart and keyed to the shaft, an oscillating lever on the shaft between the ratchet wheels, said oscillating lever having teeth on its opposite faces, pivoted members operatively connected to the ratchet wheels and adapted to move them toward and away from the lever, and elastic flexible devices connected to and adapted to operate said pivoted members, substantially as described.

7. A mechanism of the character described, comprising two oppositely positioned expansible sprocket wheels, a chain connecting the sprocket wheels, a cam constructed to simultaneously adjust both sprocket wheels, a shaft secured to turn with the cam and having two facing ratchet wheels spaced apart and keyed to the shaft, an oscillating lever on the shaft between the ratchet wheels, said oscillating lever having teeth on its opposite faces, pivoted members operatively connected to the ratchet wheels and adapted to move them toward and away from the lever, said members having notches therein, and a spring-pressed plunger engaging in the notches and holding the members in both normal positions of adjustment, substantially as described.

In testimony whereof I have signed my name to this specification in the presence of two subscribing witnesses.

WILLIAM B. KELSEY.

Witnesses:
 MARIE JACKSON,
 CHAS. E. POTTS.